United States Patent
Iannaccone et al.

(10) Patent No.: US 7,636,321 B1
(45) Date of Patent: Dec. 22, 2009

(54) METHOD AND SYSTEM FOR MEASURING ROUND-TRIP TIME OF PACKETS IN A COMMUNICATIONS NETWORK

(75) Inventors: Gianluca Iannaccone, San Mateo, CA (US); Christophe Diot, Dormans (FR); Sharad Jaiswal, Amherst, MA (US)

(73) Assignee: Sprint Communications Company L.P., Overland Park, KS (US)

( * ) Notice: Subject to any disclaimer, the term of this patent is extended or adjusted under 35 U.S.C. 154(b) by 1074 days.

(21) Appl. No.: 10/435,800

(22) Filed: May 12, 2003

(51) Int. Cl.
*G01R 31/08* (2006.01)
*H04J 3/06* (2006.01)
(52) U.S. Cl. ...................... 370/252; 370/519
(58) Field of Classification Search ............... None
See application file for complete search history.

(56) References Cited

U.S. PATENT DOCUMENTS

| | | | |
|---|---|---|---|
| 6,608,818 B1 * | 8/2003 | Abrol et al. | 370/252 |
| 6,958,998 B2 * | 10/2005 | Shorey | 370/395.42 |
| 7,012,900 B1 * | 3/2006 | Riddle | 370/252 |
| 7,133,365 B2 * | 11/2006 | Klinker et al. | 370/238 |
| 7,257,087 B2 * | 8/2007 | Grovenburg | 370/248 |
| 2002/0129161 A1 * | 9/2002 | Lloyd et al. | 709/238 |

OTHER PUBLICATIONS

Jiang, Hao. "Passive Estimation of TCP Round-Trip Times," Computer and Information Sciences, University of Delaware.
Zhang, Yin and Breslau, Lee "On the Characteristics and Origins of Internet Flow Rates," 2002.
Jaiswal, Sharad; Iannaccone, Gianluca; Diot, Christophe, et al. Measurement and Classification of Out-of-Sequence Packets in a Tier-1 IP Backbone, Sprint ATL Technical Report TR02-ATL-051023.

* cited by examiner

*Primary Examiner*—Hong Cho
*Assistant Examiner*—Eunsook Choi

(57) ABSTRACT

A method and computer-program product are provided for measuring the Round-Trip Time (RTT) of data flowing thorough a communications network using a single measurement point. The method includes timestamping a first packet traveling past the measurement point and timestamping a second packet traveling past said measurement point. These difference of these two values is the RTT. This RTT can be continuously updated during the life of the connection to provide an evermore accurate RTT measurement. Alternatively, two sub RTTs can be computed and then summed to arrive at the connection's RTT.

16 Claims, 10 Drawing Sheets

```
procedure EstimateRTT
    in:   packettype packet, int dupacks, int sndwindow, time currentTime,
          unsigned seqno, int flightsize;
    out:  time rtt;
begin
    if (currentState == DEFAULT) then if (packet == NEW_DATA) then if (seqno >= sampleSeqno) then
                rtt = currentTime - startTime;
                sampleSeqno = seqno + (sndwindow - fligthsize) * MSS;
                startTime = currentTime;
            endif elseif (packet == RETX_DATA) then
            currentState == FROZEN;

elseif (packet == DUPACK and dupacks == 3) then
            currentState == FROZEN;

endif    /* the estimation is in FROZEN state */
    else
        if (packet == NEW_DATA) then
            sampleSeqno = seqno + (sndwindow - flighsize) * MSS;
            startTime = currentTime;
            currentState = DEFAULT;         /* resume the RTT estimation */
        endif
    endif
end
```

FIG. 7

METHOD AND SYSTEM FOR MEASURING ROUND-TRIP TIME OF PACKETS IN A COMMUNICATIONS NETWORK

CROSS-REFERENCE TO RELATED APPLICATIONS

This application is filed concurrently with a related application entitled RELATED-PACKET IDENTIFICATION having common inventors as the instant application.

STATEMENT REGARDING FEDERALLY SPONSORED RESEARCH OR DEVELOPMENT

Not applicable.

TECHNICAL FIELD

The present invention relates to the field of telecommunications. More particularly, the present invention relates to observing packet transmissions in a communications network.

BACKGROUND OF THE INVENTION

In a communications network, a popular method of communicating information involves sending data in packets. A datastream can be segmented into packets and sent across the network to be reassembled at a receiving end. Each packet generally includes a header and a payload. The header includes information related to its destination and reassembly. The payload is a portion of data that recreate the substance of the datastream, which may compose a telephone call, a video clip, a sound recording, a data file, an interactive game, or anything else that existed at the sending end.

Certain factors can diminish the performance of a communications network; prolonged round-trip times and out-of-sequence packets are two examples. Enhancing and/or repairing a network is difficult to do without performance measurements, or metrics. One such metric is an accurate estimation of the Round-Trip Time (RTT) of a data (often in the form of packets) traveling between a sender and a receiver. The RTT of a connection is the time required for a data packet to travel from a source to a receiver and for its acknowledgement to travel back to the source. Techniques that have been used to measure the RTT of connections are relatively inaccurate, resource-intensive to implement, and may affect network performance.

RTT measurements are made with respect to the sender. But making measurements directly at the sender generally requires that some component be placed at the sender to make measurements. Thousands of senders necessitate thousands of measuring devices. To have a representative measure of RTT in a complex network, a great deal of resources would be needed to install the measuring components. This can be expensive. An alternative approach would be to use active techniques. Active-measuring techniques require that artificial packets be injected into the network to be measured. The best that can be expected from an active-technique method is to measure the RTT of those (that is, artificially injected) packets, as opposed to actual, in-use packets going to real customers. All active-measurement techniques suffer from the shortcomings listed above.

Two recent efforts attempt to estimate the RTT at a point along the sender-to-receiver path: the triple-handshake attempt and the slow-start attempt. But these techniques merely compute one RTT sample per TCP connection, making them inaccurate. A sample of the RTT is taken either during the triple handshake or during the slow-start phase of the connection. The primary drawback of these techniques is that they measure only one (typically the first) RTT sample per connection. If the connection experiences variable delays (as such is typical and will be explained with reference to FIG. 10 below) during data transmission, the single measurement take may be highly unrepresentative of actual RTT values associated with that connection. Although the first packet may experience a certain delay, the likelihood of that delay being representative of RTT values over the connection's lifetime is low. This would be somewhat analogous to assuming that the time to commute to work is always the same as the time it took to commute on the very first day. Moreover, there is no guarantee that a particular sample was itself an accurate RTT estimate at the instant it was computed. For example, many Web servers respond to the first packet of a connection with a corresponding acknowledgement packet (ACK) only after some delay. Accordingly, these methods tend to lead to an overestimation of actual RTT times.

The current state of the art could be improved by providing a method and system that accurately measures the RTT of in-use data flowing through a connection in a communications network. The art could also be improved by provided a method for identifying respective packets that compose a data stream.

SUMMARY OF THE INVENTION

The present invention provides a method and system for computing the current round-trip time (RTT) of a connection between a sender and a receiver in a communications network. The present invention has several practical applications in the technical arts not limited to assessing the quality of a connection, computing bandwidth, and identifying out-of-sequence packets. Accurately measuring the RTT of a connection enables a carrier to know how long the delay is between successive packet transmissions. Corrective action can be taken when an RTT delay breaches a prescribed threshold.

RTT estimation can be used to detect the root cause of out-of-sequence packets. Out-of-sequence packets can result from many causes including loss, looping, reordering, or duplication in the network. It is important to quantify and understand the causes of such out-of-sequence packets since they are one indication of the "health" of an end-end TCP connection. Where out-of-sequence packets are measured at a single point (rather than by sending and measuring end-end problem traffic at the sender or the receiver), accurate connection RTT delays are needed to determine the cause of out-of-sequence packets, as will be described in greater detail below.

An RTT estimate is taken per congestion window full of packets sent by the sender. As used herein, a congestion window (CWND) is the maximum number of packets that a sender can send at any time. Knowledge of the congestion window and RTT permits one to compute the available bandwidth of the connection. Indeed, the connection's bandwidth can be computed as the quotient of CWND and RTT:

$$\text{Bandwidth} = \frac{CWND}{RTT} \qquad (1)$$

The RTT is calculated at a single point between a sending device and a receiving device. This technique is a passive technique that monitors real, in-use data. In one embodiment, the technique involves timestamping a first packet (or starting at time t=0), timestamping a subsequent packet that is associated with the first packet sent incident to a valid transmission of the first packet, and calculating a difference in the two timestamps. In other embodiments two sub RTT values can be added to determine the sender's RTT.

In another aspect of the present invention, corresponding packets that compose a packet stream are identified. Historically, it has been difficult to identify packets within packet groups that are subparts of a data stream. When these packets are identified, measurements can be taken to determine a variety of values including the RTT. A first sequence number is received by the present invention, which then determines the length of its packet group if applicable. This length is multiplied by a protocol-specific parameter if necessary and added to the first sequence number to arrive at a new sequence number that identifies the desired packet.

BRIEF DESCRIPTION OF THE SEVERAL VIEWS OF THE DRAWINGS

The present invention is described in detail below with reference to the attached drawing figures, wherein:

FIG. 7 depicts exemplary pseudocode used in connection with the present invention;

DETAILED DESCRIPTION OF THE INVENTION

Figure 1:
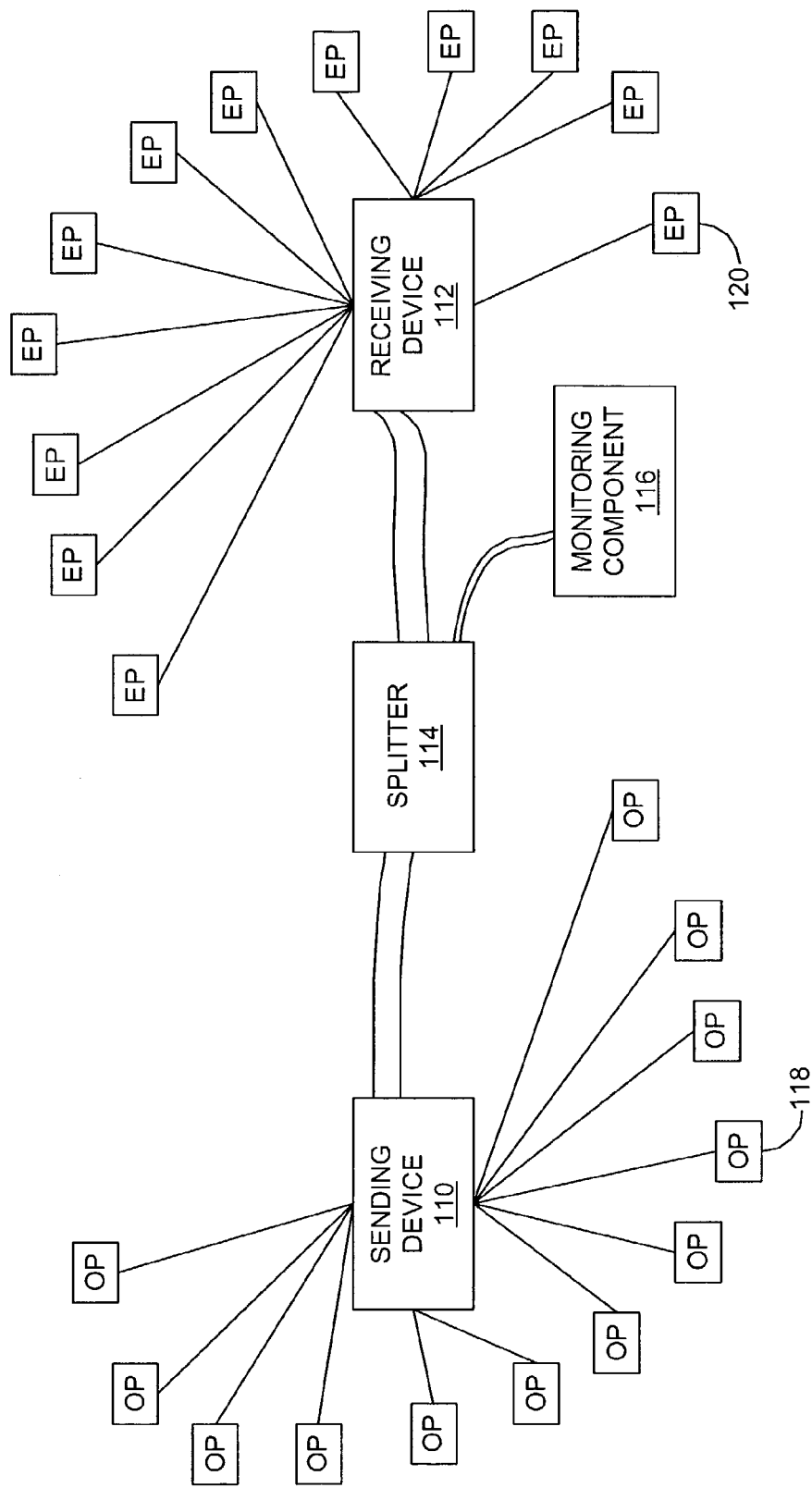
FIG. 1 is a block diagram of an exemplary operating environment suitable for use in implementing the present invention.

The present invention relates to a method for measuring the Round-Trip Time (RTT) of a connection within a communications network. Various telecom technical terms are used throughout this disclosure. A definition of such terms can be found in *Newton's Telecom Dictionary* by H. Newton, 19th Edition (2003). These definitions are intended to provide a clearer understanding of the ideas disclosed herein but are in no way intended to limit the scope of the present invention. The definitions and terms should be interpreted broadly and liberally to the extent allowed by the art and the meaning of the words offered in the above-cited reference.

As one skilled in the art will appreciate, the present invention may be embodied as, among other things: a method, system, and/or computer-program product. Accordingly, the present invention may take the form of a hardware embodiment, a software embodiment, or an embodiment combining software and hardware. In a preferred embodiment, the present invention takes the form of a computer-program product that includes computer-useable instructions embodied on one or more a computer-readable media.

Computer-readable media include both volatile and nonvolatile media, removable and nonremovable media, and include media readable by a database, a switch, and various other network devices. Network switches, routers, computers, and related components are conventional in nature, as are means of communicating with the same. By way of example, and not limitation, computer-readable media include computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media, other optical-storage devices, magnetic cassettes, magnetic tape, magnetic disk storage, other magnetic storage devices, and solid-state devices such as thumb drives. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless-media technologies. Combinations of the above are included within the scope of computer-readable media.

Exemplary Operating Environment

FIG. 1 depicts an illustrative operating environment suitable for practicing the present invention. A sending device 110 communicates data to a receiving device 112. Because the present invention relies on passive measuring techniques, a splitter 114 is placed within the connection that receives what is essentially duplications of data communicated from the sending device 110 to the receiving device 112. Simplistically, splitter 114 functions in a manner similar to that of a "Y" splitter whereby data is not lost when sent to a monitoring device 116 as shown. Several originating points 118 (i.e., millions) may pass data directly to a like number of end points 120. Passive measuring techniques do not interfere with real data sent from sending device 110 to receiving device 112.

Monitoring device 116 can be a conventional computer such as a server with a central processing unit and memory components that communicate with various peripheral devices through appropriate input/output busses and paths as is well known in the art. Monitoring device 116 can process computer-useable instructions and is equipped with one or more computer-readable media including those described above. Those skilled in the art will appreciate that monitoring device 116 is not limited to a conventional computer but may take the form of a Personal Data Assistant (PDA), handheld PC, tablet PC, mainframe computer, node, and the like.

Out-of-Sequence Packet Identification

As explained above, quantifying the number of out-of-sequence packets communicated through a given connection can help improve a carrier's network. Because RTT computation is highly relevant to out-of-sequence packet identification, a discussion of out-of-sequence is included here.

An important characteristic of any packet-type connection is the sequencing of packets within that connection. Each member of a monotonic sequence is greater than or equal to the preceding member. Generally, if sequence numbers are monotonically increasing, then data flows through a connection without loss. The network does not introduce problems such as in-network duplication, reordering, or looping. Conversely, out-of-sequence packets indicate that a connection suffers from loss, duplication, reordering, or looping. A high frequency of out-of-sequence packets is an indication of poor connection performance.

A packet is out-of-sequence if it has a sequence number that is smaller than that of a previously observed packet. As briefly described herein, out-of-sequence packets can be identified based only on measurements taken in the "middle" of the connection. "Middle" is not meant to imply midpoint and should not be construed as such. Rather, "middle" refers generally to a point between a sending device and a receiving device. Making measurements (including RTT measurements) in the middle of a connection, such as a communications backbone, affords the advantage of being able to characterize the behavior of flows between a very large number of source-destination pairs without having to instrument the individual senders and receivers. Instrumenting a component involves adding measuring devices, components, and/or code to monitor that component. Historically, if a connection was to be monitored, equipment had to be added at the sending point, receiving point, and/or both.

Using a single measurement point (or packet-identification point) enables sampling traffic from a large number of connections but poses realization challenges. Taking measurements in the "middle" of a connection precludes knowing whether data observed at the measurement point was received at the intended destination. Techniques and rules are provided to infer and classify the causes of observed out-of-sequence behavior. Using these techniques, it is possible to classify almost all out-of-sequence packets in tested traces. By employing the RTT-measurement techniques below, out-of-sequence behavior of several million TCP-type connections can be observed and characterized. Additional information related to the methodologies of identifying out-of-sequence packets at a single point and the positive results of using the RTT-measuring techniques discussed below are provided in an article entitled "Measurement and Classification of Out-of-Sequence Packets in a Tier-1 IP Backbone" and subtitled "Sprint ATL Technical Report TR02-ATL-081023," which is incorporated by reference herein.

As previously mentioned, using a single measurement point within a connection to measure RTT offers many advantages. One advantage includes being able to sample traffic from a large number of source-destination pairs without having to instrument the individual senders and receivers. That is, the individual senders and receivers do not need to be equipped with sending, receiving, and/or measuring devices. Sparing such instrumentation conserves resources by not requiring devices to be procured and installed at each endpoint. But measuring RTT at a single point within a connection presents several methodological challenges.

Figure 2:
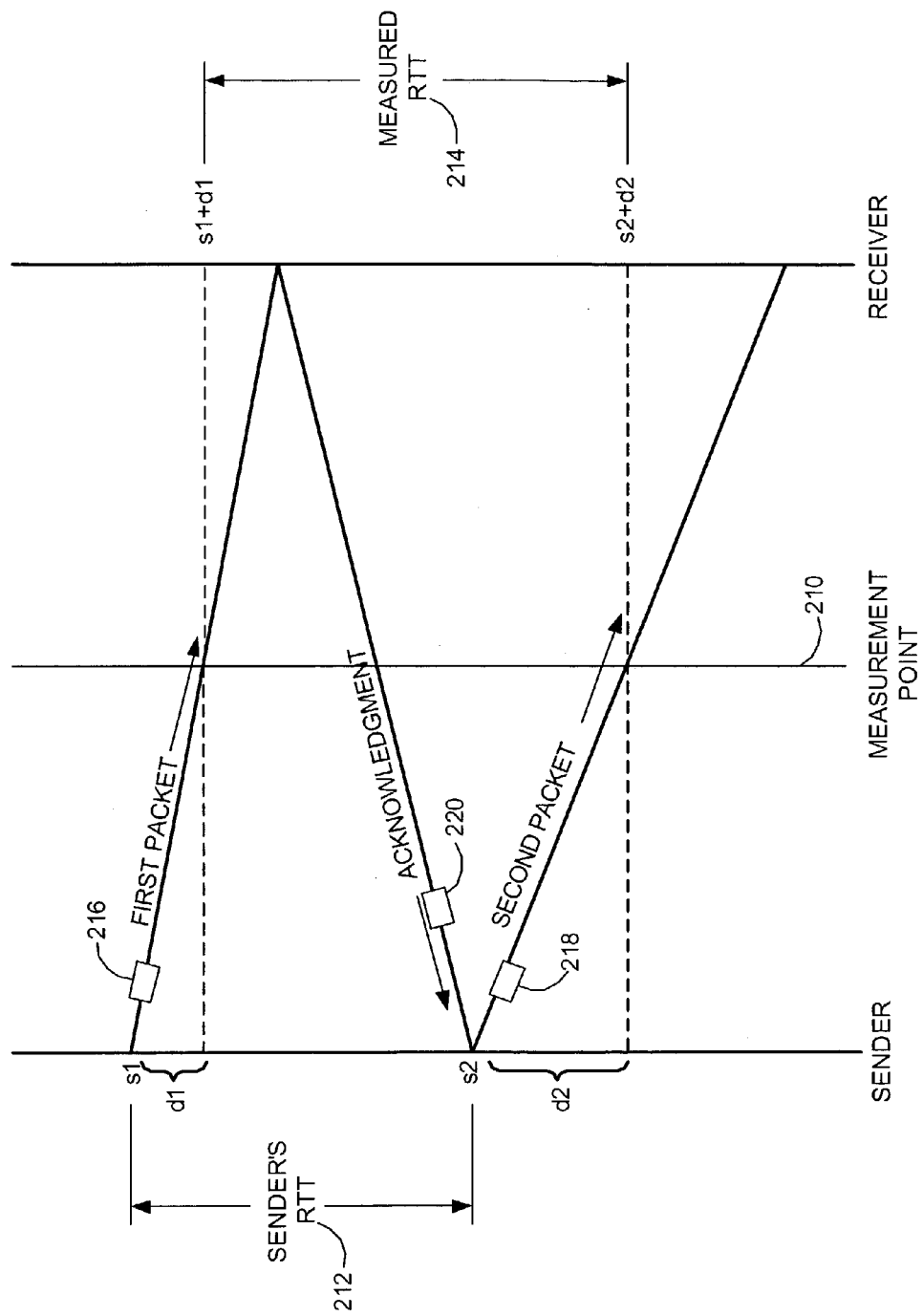
FIG. 2 is an exemplary diagram illustrating differences in RTT delays according to an embodiment of the invention.

FIG. 2 illustrates differences in RTT delays. The RTT observed at a measurement point 210 and the RTT observed at the sender can differ. Thus, the measured RTT 214 may be different from the sender's RTT 212. With continuing reference to FIG. 2, the sender transmits a first packet 216 of time s1, and the packet 216 is observed at the measurement point 210 after a delay d1. The sender sends a second packet 218 (after receiving an acknowledgment 220 of the first packet 216) at time s2. This second packet 218 arrives at the selected measurement point 210 after delay d2. In this case, the sender's RTT 212 is equal to the difference of s2−s1. But at the measurement point 210, the measured delay 214 is (s2−s1)+(d2−d1). Depending on whether d2 is greater or smaller than d1, the observed RTT 214 will either overestimate or underestimate the sender-observed RTT 212. In the following section, a simulation scenario is provided to estimate the magnitude of this difference, and provide an accurate measurement of the sender's RTT.

A related problem is estimating the delays within the end hosts themselves between the receipt of an acknowledgment 220 and the transmission of the data packet triggered 218 by the acknowledgment receipt. However, delays in the sender's and receiver's operating system are an inherent component of the actual sender-measured RTT as well.

RTT Estimation

As discussed earlier, the need to estimate the RTT of a TCP-type connection is an important aspect in a variety of situations. Recall that among the other applications provided, RTT estimation plays a role in computing the Retransmission Time-Out interval (RTO) of a connection. The RTO is used in algorithms and rules to identify in-network reordering and duplication.

Figure 3:
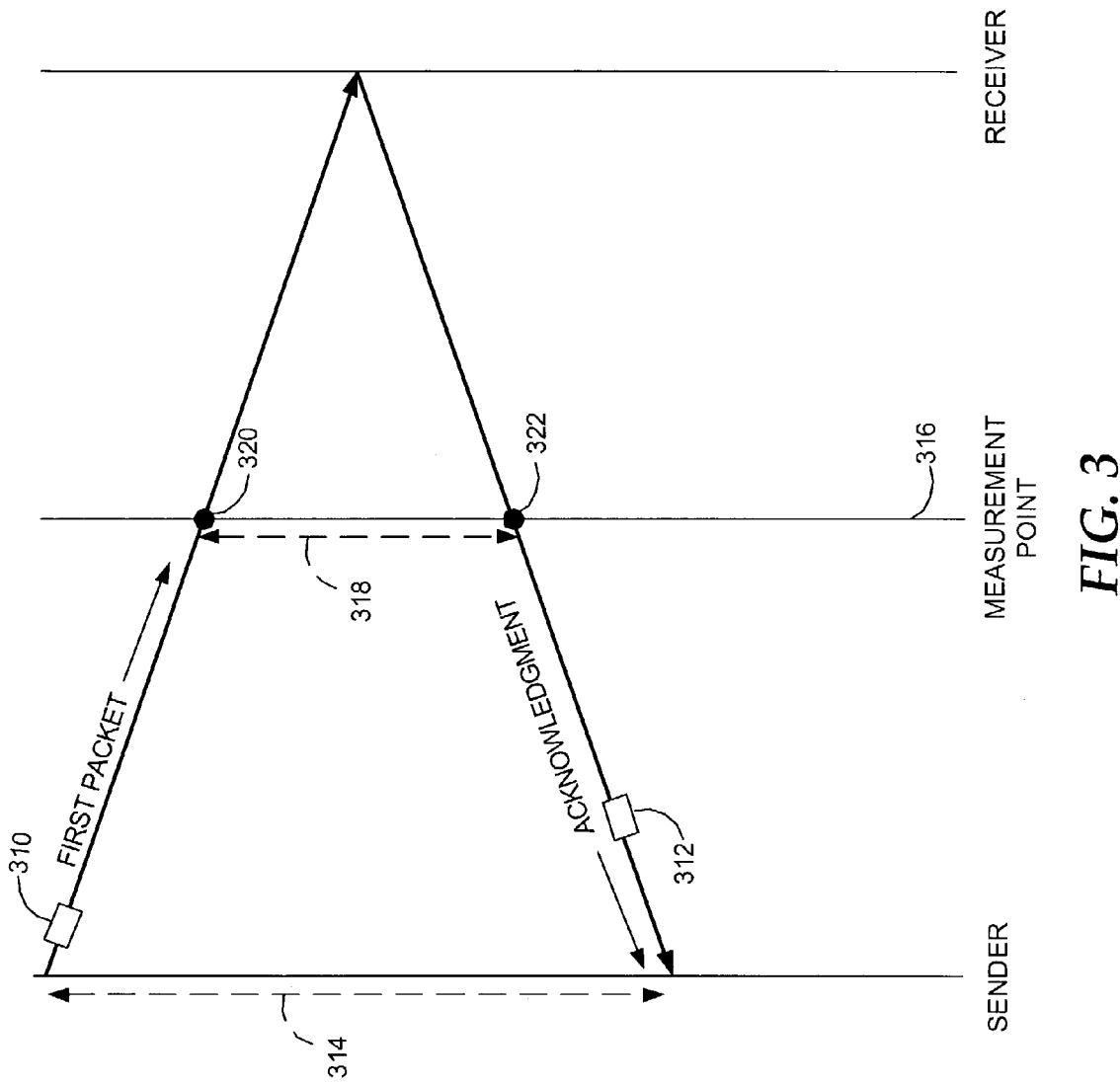
FIGS. 3-4 are timeline diagrams that depict an exemplary measurement technique employed by the present invention.

A difficulty of calculating the RTT of a connection from an observation point that is in the "middle" of the connection's path can be illustrated with reference to FIG. 3. As shown in FIG. 3, a sender calculates the RTT by computing the time interval between its transmission of a first data packet 310 and the receipt of its corresponding acknowledgement 312. This interval of time is indicated by reference numeral 314. As shown in FIG. 3, if the present invention were to simply to measure a time duration 318 between the measurement point's observation 320 of the data packet and its corresponding acknowledgement point 322, then the sender-to-measurement-point and measurement-point-to-sender delays would not be accounted for in the RTT estimate.

Figure 4:
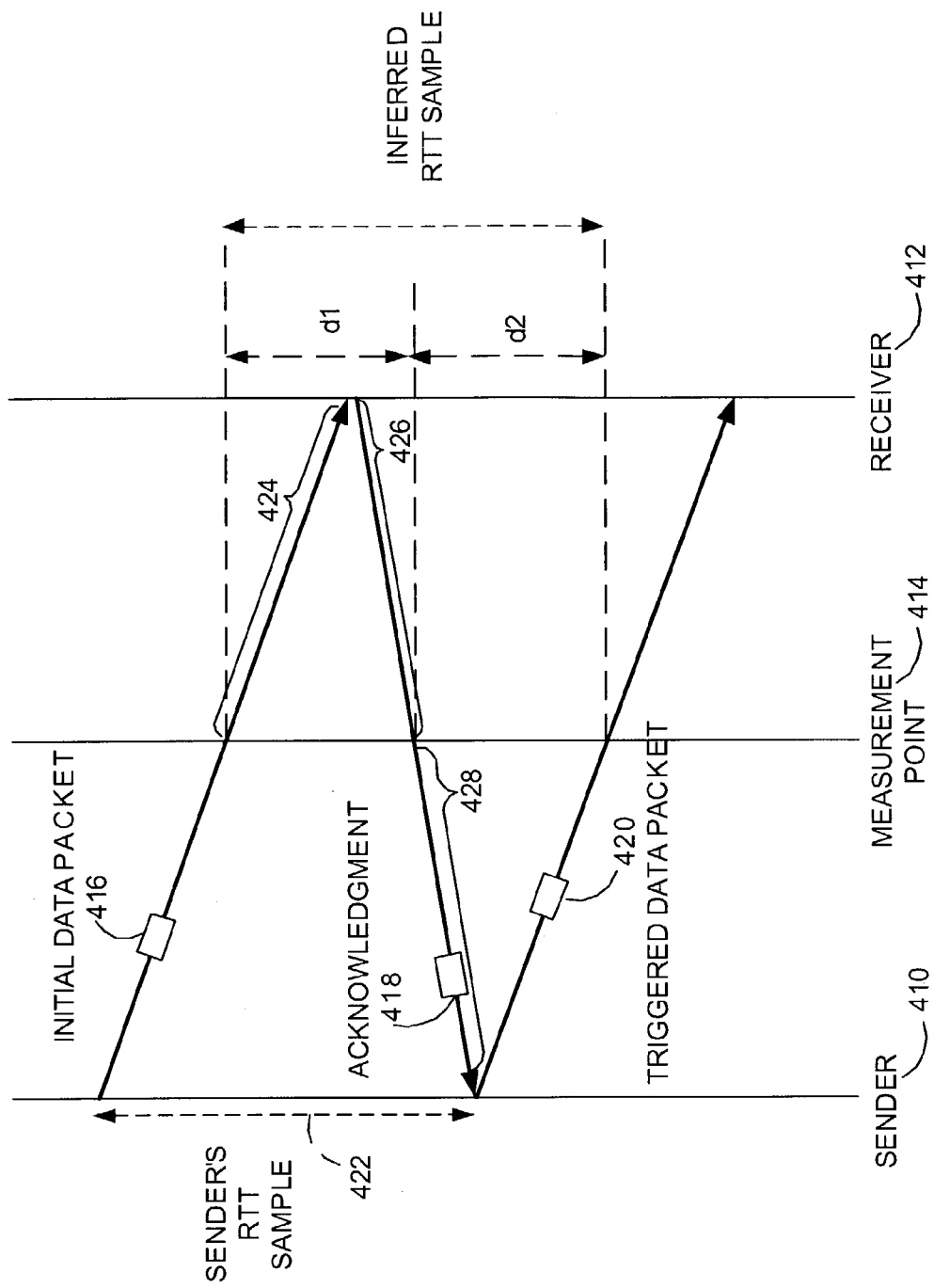

The present invention provides a new technique to dynamically estimate the RTT of a connection over the connection's lifetime from a single measurement point on the path between a sender and receiver. One embodiment of the present invention is provided with reference to FIG. 4. Data is sent between a sender 410 and a receiver 412. RTT is measured at a single point, a measurement point 414, which lies between the sender 410 and receiver 412. An initial data packet 416 is sent from sender 410 to receiver 412, whereby an acknowledgement 418, when received at the sender 410, triggers the transmission of data packet 420.

An accurate measurement of the sender's RTT sample can be computed by measuring two things: first, the round trip d1 from the measurement point 414 to the receiver 412 (indicated by segment 424) and then back to the measurement point (segment 426); and second the round trip delay d2 between the measurement point 414 and the sender 410 and then back to the measurement point 414. The RTT is the sum of these two delays d1+d2.

The RTT estimation is updated as a running RTT estimation because the method makes RTT estimates based on the measured values of d1 and d2 throughout the connection's lifetime. The RTT is exact when the sender's RTT sample, d1 and d2 do not change from one packet to the next. As the quantities vary from packet to packet, the RTT estimate will be approximate, but accurate.

Figure 5:
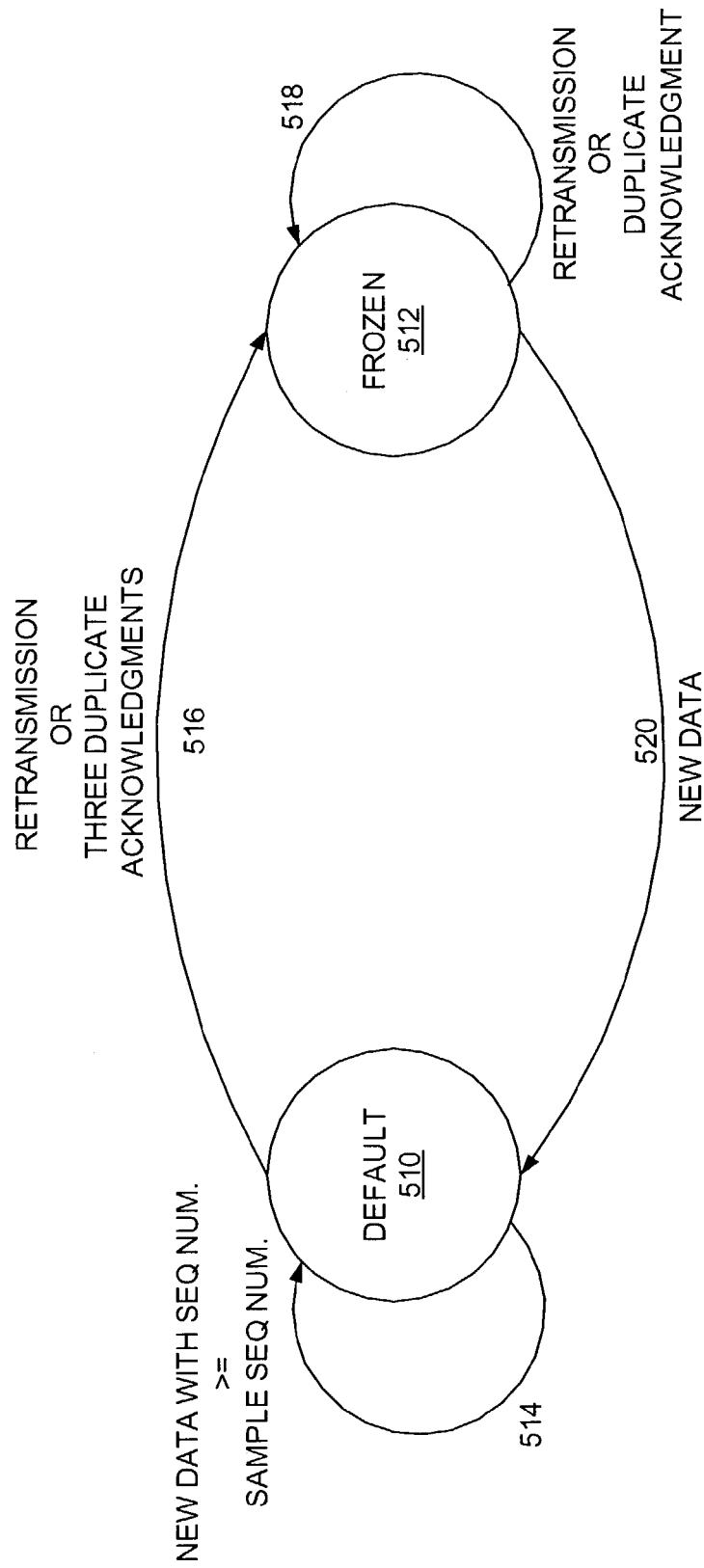
FIG. 5 is a state diagram that depicts transitions between two states of the present invention in an exemplary embodiment.

FIG. 5 is a state diagram representing an illustrative embodiment of the present invention. Two states are shown: a default state 510 and a frozen state 512. These two states are provided to account for packet-transmission problems. Packets may not reach their intended destinations. When they do not, a retransmission of the same packet is sent. Such a retransmission can lead to a misrepresentation of the connection's true RTT if it is mistaken for the originally transmitted packet. This would be similar to losing a letter in the mail, remailing the letter, and then characterizing the time to receive the second letter as representative of the time it takes to receive letters that are not lost. Similarly, acknowledgments may not reach their intended destinations (such as sender 410). If an acknowledgement is lost, especially before it crosses the chosen measurement point, then this too would produce an unrepresentative RTT. To minimize the effects of these errors, the present invention implements an embodied algorithm that distinguishes good data from bad data Before discussing the state diagram of FIG. 5, the more detailed flow diagram of FIG. 6, and the exemplary pseudocode of FIG. 7, reference is made to the tables below that explain various inputs and outputs.

TABLE I

Inputs

| Argument | Input Type | Remarks |
| --- | --- | --- |
| Packet Type | New_Data \| Retx_Data \| Dup_Ack | Packet types that cause the procedure to be invoked |
| Num_DupAcks | Integer | Number of duplicate acknowledgements |
| CWND | Integer | Current estimate of the sender's window |
| Time | | Current time |
| Cur_SeqNo | Sequence number | Sequence number of a New_Data packet |
| Flight_Size | Integer | Unacknowledged data packets |

Table I describes inputs available to the present invention. PacketType indicates the statuses or types (not in a protocol sense) of packets that cause the procedure (such as that in FIG. 7) to be invoked. Those skilled in the art will appreciate other packet types, but for simplicity's sake and with respect to a preferred embodiment, three values are available: New_Data, Retx_Data, and Dup_Ack. New_Data is data that is received in normal operation. These are packets with different sequence numbers and will include the vast majority of packets monitored. Retx_Data denotes packets that are retransmitted packets. Dup_Ack denotes a duplicate acknowledgement.

Num_DupAcks is an integer that indicates how many duplicate acknowledgements have been received, inclusively. After three duplicate acknowledgements have been received, a state change will occur. CWND is a packet-group-length identifier that reflects a current estimation of the packet-group length. The Cur_SeqNo refers to the sequence number of a New_Data packet. Flight_Size is an integer that denotes unacknowledged data packets. Variables that are provided to the present invention are included in Table II.

TABLE II

Variables

| Name | Type | Remarks |
| --- | --- | --- |
| State | Default \| Frozen | RTT estimation is currently frozen or not |
| StartTime | | Time at which this estimate for the RTT started |

TABLE II-continued

Variables

| Name | Type | Remarks |
| --- | --- | --- |
| SampleSeqno | Sequence number | Sequence number of data packet from which the next RTT sample is to be taken |
| MSS | Bytes | Maximum Segment Size for this connection |
| Unused_Wnd | Integer | Sender's window currently unused to send data |

Table II lists certain variables that are used by the present invention. The state of RTT estimation can be either Default or Frozen. StartTime is a timestamp of the time that the current estimate for the RTT began. SampleSeqno is a number, a sequence number, corresponding to the data packet from which the next RTT sample is to be taken. MSS is a value that is well known in the art and reflects in bytes a Maximum Segment Size for a particular connection. Different protocols and different operating systems use different maximum segment sizes and this value is included for calculation purposes. Unused_Wnd is an integer value of the number of unused data reservoirs of a window, or packet group.

TABLE III

Outputs

| Argument | Remarks |
| --- | --- |
| RTT_Estimate | current RTT sample |

As reflected in Table III, a preferred embodiment produces RTT_Estimate as an estimate of the current RTT sample. For the examples discussed herein, an input format is provided as follows: <PacketType, Num_DupAcks, CWND, Time, Cur_SeqNo, Flight_Size>. The input format includes the packet type, number of times a duplicate packet has been received (if applicable), the sending windows, current sequence number, and the flight size of a packet group.

TABLE IV

State Changes

| State | Input | Action |
| --- | --- | --- |
| <DEFAULT> | <New_Data,*, CWND, time, cur_seqno, flight_size> | if (cur_seqno>=sampleSeqno) rtt=time−startTime unused_wnd=CWND−flight_size sampleSeqno=cur_seqno+unused_ wnd*MSS startTime=time state=DEFAULT |
| <DEFAULT> | <Retx_Data, *,*,*,*,*> | state=FROZEN |
| <DEFAULT> | <Dup_ACK, 3,*,*,*,*> | state=FROZEN |
| <FROZEN> | <New_Data, *,*, time, cur_seqno, flight_size> | unused_wnd=CWND−flight_size sampleSeqno=cur_seqno+unused_ wnd*MSS startTime=time state=DEFAULT |

Table IV is best explained with reference first to the state diagram of FIG. 5 and then to the more detailed FIGS. 6 & 7. Turning first to FIG. 5, the present invention may be in default state 510. If a new data packet is received that has a sequence number greater than or equal to the sequence number of the then current packet, then the present invention remains in default state 510, as indicated by path 514. But if a retransmission occurs or third duplicate acknowledgement, the state changes from default state 510 to frozen state 512 as indicated by transition 516. Frozen state 512 persists upon subsequent retransmissions of duplicate acknowledgments as indicated by path 518. But if new data is received while in frozen state 518, then the present invention reverts to default state 510 as indicated by transition path 520.

Figure 6:
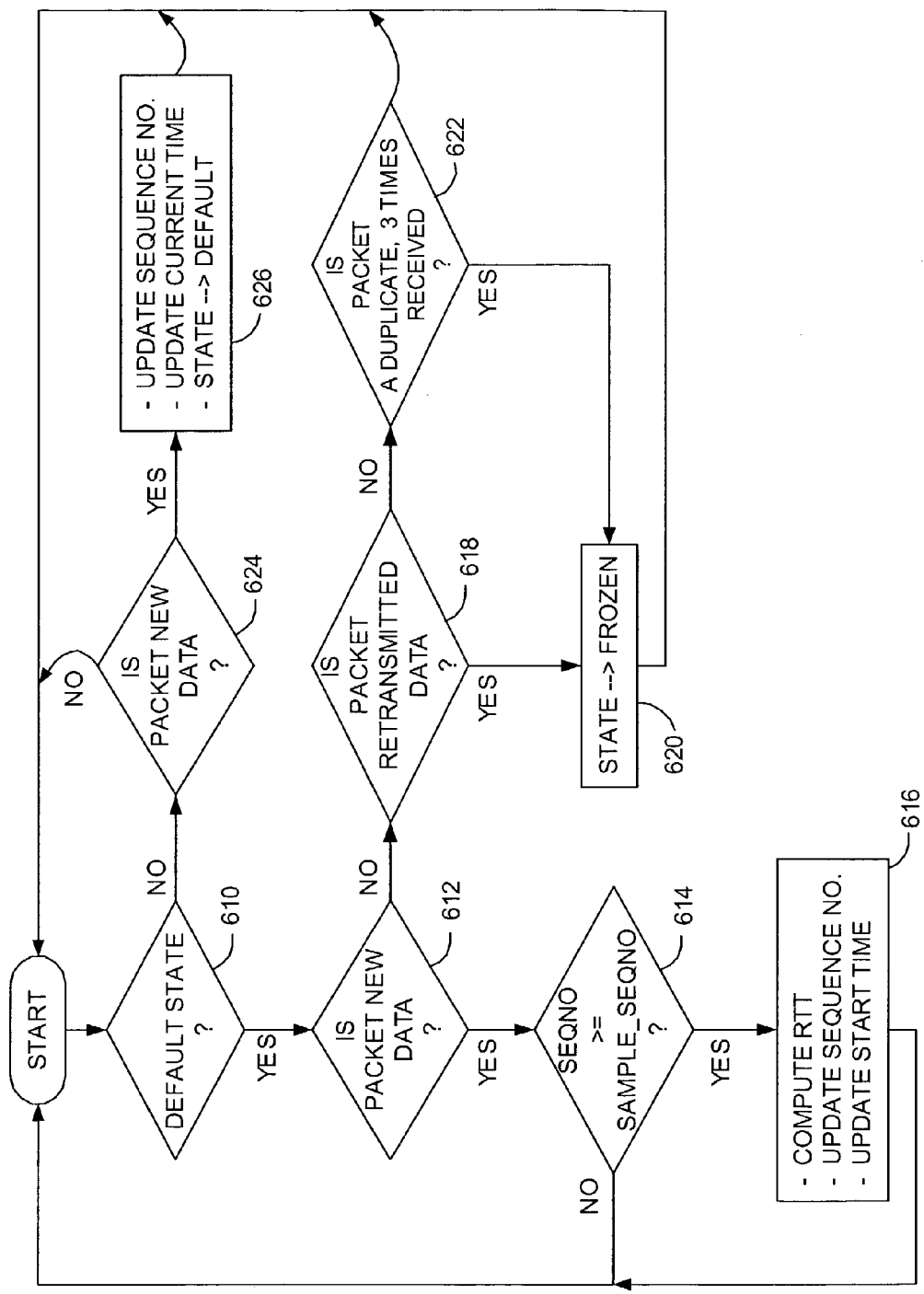
FIG. 6 is a detailed process flow illustrative of an exemplary method used by the present invention.

Turning now to FIG. 6, a more detailed process flow diagram, consistent with Table IV, is provided. A skilled artisan would recognize that the steps of FIG. 6 may be performed in different orders and that some may not be required. The following explanation is with respect to a preferred embodiment only and although the term "packet" is used, it is not to imply that only individual packets, as opposed to packet groups, are processed. Indeed the latter is expressly contemplated by the CWND parameter.

Incident to receiving data, a determination is made at a step 610 as to whether the present invention is currently in default state 510. At a step 612, if the data received is new data, then a determination is made at a step 614 as to whether the sequence number of the packet received is greater than or equal to the current sequence number. If so, then three things happen: the RTT is computed as the difference between the current time and the StartTime; the received packet's sequence number becomes the current sequence number subject to an appropriate offset (SampleSeqno=Cur_SeqNo+ Unused_Wnd*MSS); and the StartTime is updated to the current time. The process then restarts, maintaining the default state 510.

If at step 612 the data received is not new data, then a determination is made at a step 618 whether the packet is retransmitted data. If so, the state is migrated to frozen state 512 at a step 620. If the data is not retransmitted data, then a determination is made at a step 622 as to whether the packet is a thrice duplicate-acknowledgment packet. If it is, then the invention's state becomes frozen state 512; but if not, the process restarts.

If the initial state of the present invention was not default state 510 at step 610, the data is still checked to determine whether it is new data at a step 624. If not, the present invention remains in a frozen state and restarts. But if the data received is new data then the sequence number is updated to that of the packet received. The start time is updated to the current time, and the state of the present invention reverts to default state 510.

Exemplary pseudocode to implement the described techniques is provided in FIG. 7. Those skilled in the art will appreciate the litany of alternatives of implementing the aforementioned techniques and the many computer languages and development tools available to flesh out the provided pseudocode. The "EstimateRTT" procedure is provided for illustrative purposes to describe the functionality offered by the present invention.

Packet Identification

An important requirement of the running RTT estimation technique is the ability to distinguish among packets sent in successive, related packet groups. To accurately identify first packets of successive packet groups that compose a data stream, the present invention uses a congestion-window (CWND) measurement. This process enables distinguishments among packets sent in successive congestion windows. The flow reconstruction and classification mechanism previously described also keeps track of the estimated state of the connection (i.e., whether the connection is in slow-start, congestion-avoidance, fast-recovery, etc.). Using this information of the observed packet and acknowledgment transmissions, the value of CWND and the estimated connection state can be updated over time. The CWND parameter is set according to the version of protocol being used for data communication. For example, WINDOWS 2000® may have a different CWND than Linux. The present invention uses the correct CWND based on the protocol version. In a preferred embodiment, the protocol version is assumed to be Reno and changed if necessary. The present invention determines the appropriate CWND, multiplies it by the correct MSS value (described above), and adds that product to the current packet's sequence number to determine the correct sequence number of the next related packet. With the correct sequence number, the present invention identifies what packet's timestamp to sample. This method is explained in greater detail with reference to FIG. 8.

Figure 8:
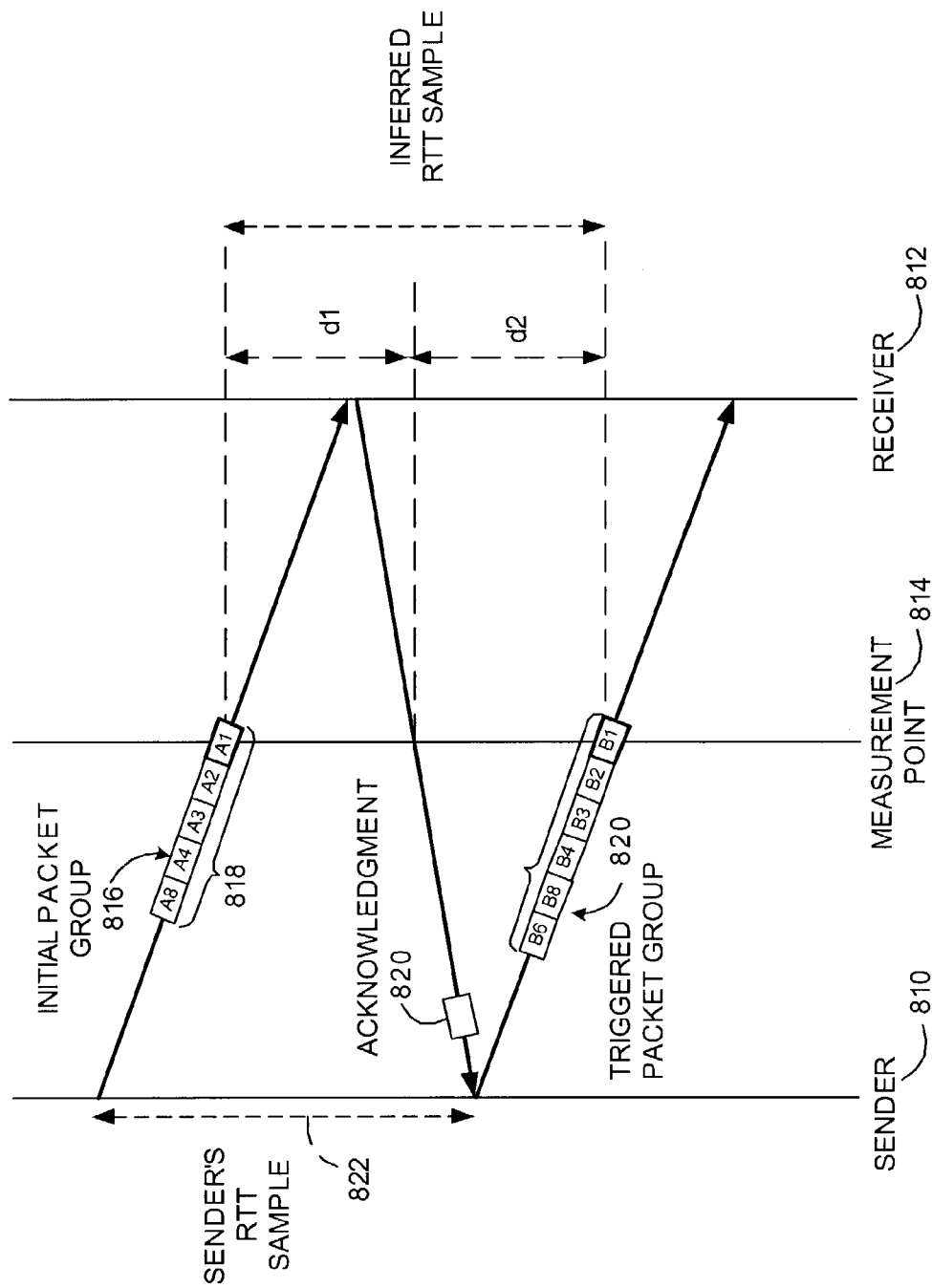
FIG. 8 is a timeline diagram detailing how subsequent first packets can be identified in an embodiment of the present invention.

FIG. 8 provides an exemplary illustration of two packet groups being transmitted from a sender 810 to a receiver 812. Related packets will be identified at a measurement point 814 (identification point), which lies between the sender and the receiver. The two packet groups are subcomponents of a data stream. Those skilled in the art will appreciate that a data stream can be partitioned into packet groups, which are then sent through a connection. These packet groups are then received and ordered to recreate the sent data stream.

An initial packet group 816 is sent to receiver 812. As shown, initial packet group 816 is composed of packets identified as A8, A4, A3, A2, and A1. A1 is the first packet of initial packet group 816, which has a CWND 818 of five. The congestion window of initial packet group 816 is made of five packets. An acknowledgement 820 is sent to the sender 810 after the initial packet group 816 is received by receiver 812. The RTT sample is still d1+d2, but the problem addressed here is how to measure d2. The present invention measures successive first (although any $n^{th}$ packet can be used) packets of successive packet groups that are related to each other. In this example, packet group "B" is the packet group successive to packet group "A." Triggered packet group 820 is sent in response to receiving acknowledgment 820. For the sake of simplicity, triggered packet group 820 and initial packet group 816 are subcomponents of a common data stream.

To identify corresponding first packets of respective successive packet groups, the CWND parameter is used. Here, successive first packets in this example are "A1" and "B1." D2 can be measured when "B1" is identified. The present invention utilizes the congestion window to identify "B1" with respect to "A1." B1=A1+CWND. Note, the MSS parameter is assumed here to be one. To abstract this concept, the present invention identifies successive first packets by summing a CWND value with a known first-packet location.

$$\text{SuccessiveFirstPacket} = \text{PreceedingFirstPacket} + CWND \qquad (2)$$

Improvements Over the Prior Art

The effectiveness of the disclosed RTT estimation technique is evaluated using the ns-2 simulator. The estimates made at the measurement point using the present invention's RTT estimation algorithm can be precisely compared with the actual RTT estimates as calculated by the sender using a simulated environment, in which complete information about the behavior of the senders is available. The simulated environment also allows control over network parameters—such as the average loss, location of bottlenecks, and the delays experienced by a flow—and thus evaluates the present invention under a wide range of conditions.

The RTT estimation algorithm taught herein will be compared with the triple-handshake RTT estimation technique, which (as noted above) takes a single RTT estimate at the start of a connection using the observed SYN and ACK messages, and then uses this value as the RTT estimate for the connection's lifetime.

Figure 9:
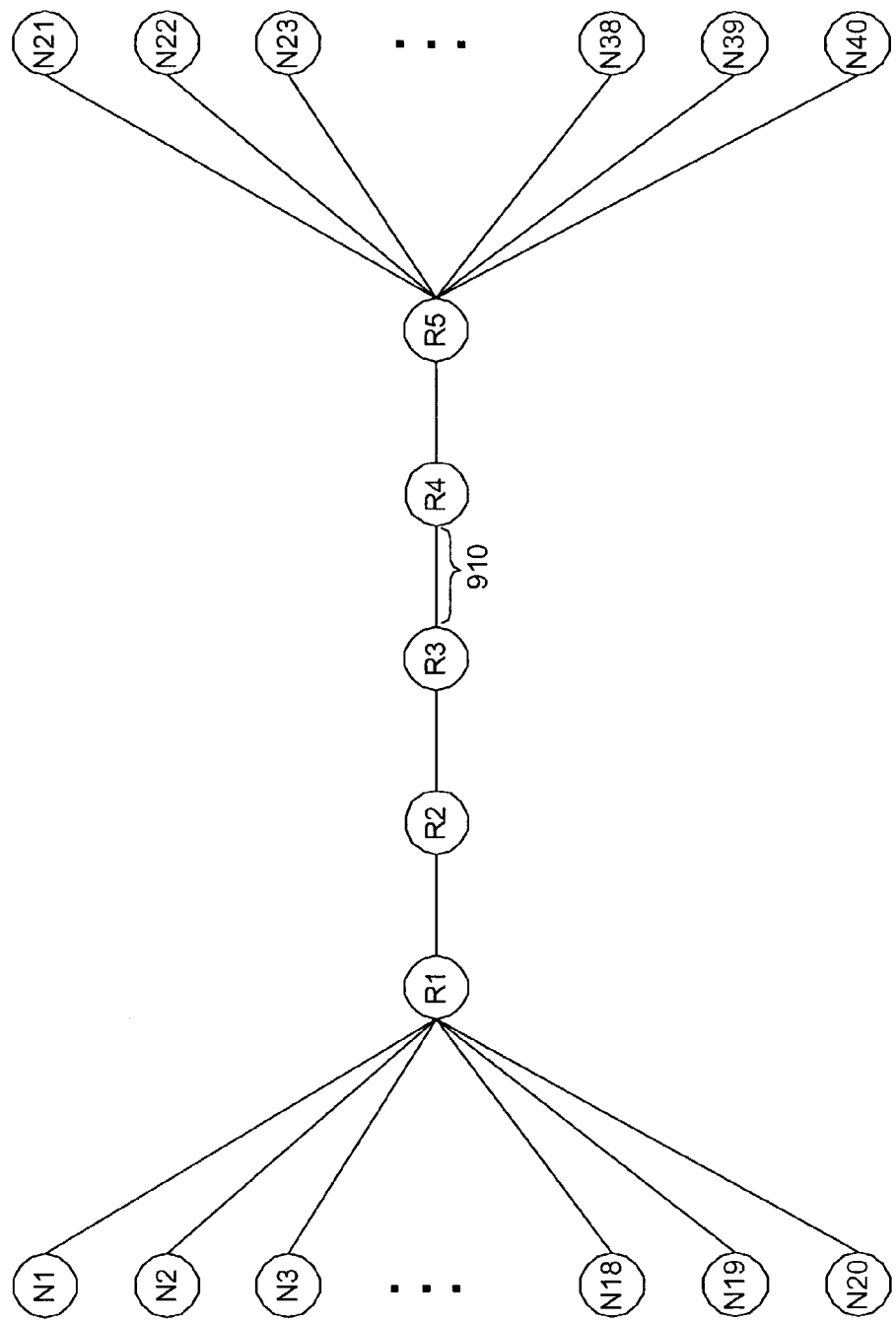
FIG. 9 represents a simulation topology used to test the effectiveness of the present invention.

The simulation topology used is illustrated in FIG. 9 and includes twenty nodes each on the left (N1-N20) and on the right (N21-N40), and five links (R1-R5) between any node-pair. Cross-traffic is created with 100 long-lived flows traversing the links R2-R5. These long-lived flows remain for the entire length of the experiment and have an infinite amount of data to send. The arrival of 3800 short flows and 200 additional long-lived flows are scheduled with uniformly distributed inter-arrival times over the 40-second duration of the experiment. The senders of these flows are equally divided over nodes N1 through N40 in both directions. A short flow lasts for five seconds and transmits fifteen packets during its lifetime. Each of the 200 long-lived flows last for exactly 30 seconds (or until the end of the simulation) and transfers as much data as it can during its lifetime.

These short-lived flows contribute to the variability in traffic seen by a flow over its long time. All flows for these tests implement TCP Reno, but those skilled in the art will appreciate that similar results would be reached with various protocols. Link 910 is designated the bottleneck link for this experiment and its characteristics are manipulated to vary the delay and loss seen by the flows. An example set of parameters used would be a bandwidth of 10 Mb, a propagation delay of 100 ms, and a queue length of 500 packets. Since the packet size is 500 bytes, the queue length is thus twice the bandwidth-delay product of the link. In the experiments presented below, the flows experience on the order of 5% loss. The measurement point in the simulation is located at link 910.

Figure 10:
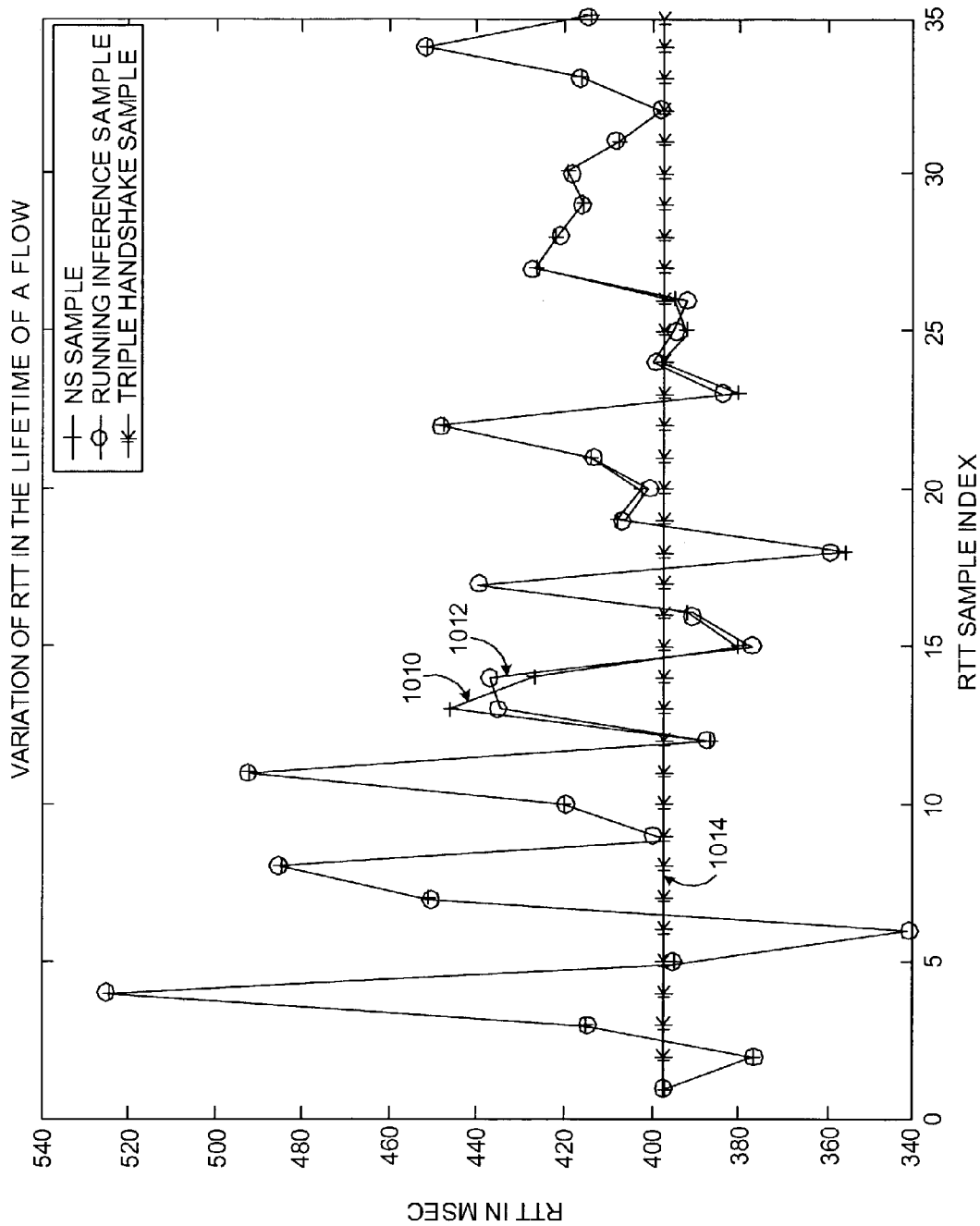
FIG. 10 plots the RTT between nodes N5 and N25 of FIG. 9.

FIG. 10 plots the RTT between nodes N5 and N25, as (i) measured at the ns sender 1010, (ii) estimated at the single measurement point on the r3-r4 link 1012, and (iii) estimated using the triple handshake approach 1014 at the single measurement point. FIG. 10 illustrates the variation in the true sender RTT as a function of time. Clearly, the triple-handshake technique 1014 does not keep track of such variations and can thus produce a poor connection-lifetime estimate. On the other hand, the estimation technique employed by the present invention 1012 dynamically tracks these variations in the RTT with very good precision, even though it is making these estimates based on observations in the "middle" of the N5 to N25 path.

Upon reading this disclosure, those skilled in the art will appreciate alternative means of implementing the described methods and processes for measuring RTT at a single point within a connection. Those skilled in the art of computer programming appreciate that programs can be written in a variety of languages and a variety of means and in a variety of ways. The aforementioned disclosure should not be interpreted as limited to the specific order of any steps mentioned in the various process-flow and state diagrams.

As can be seen, the present invention and its equivalents are well-adapted to provide a new and useful method for measuring a connection's RTT. Many different arrangements of the various components depicted, as well as components not shown, are possible without departing from the spirit and scope of the claimed invention.

The present invention has been described in relation to particular embodiments which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention. It will be understood that certain features and subcombinations are of utility and may be employed without reference to other features and subcombinations and are contemplated within the scope of the claims.

The invention claimed is:

1. One or more tangible computer-storage media have computer-readable instructions embodied thereon for performing a method for computing the Round-Trip Time (RTT) of data packets flowing through a connection pathway having a beginning and an end, comprising
    providing a measurement point between said beginning and said end;
    maintaining a measuring point of the telecommunications pathway in a frozen state that persists as long as retransmitted data packets are consecutively received by the measuring point;
    receiving from a sender a new data packet that is destined for a receiver,
    determining that said packet includes a sequence number that is greater than or equal to another sequence number of a previously received packet;
    transitioning the measuring point to a default state that is usable to compute the RTT of the new data packet;
    passively measuring a first duration of time that spans:
        (1) from when the packet passes said measurement point to when it reaches its intended receiver; and
        (2) from when an acknowledgement corresponding to said packet's reception travels from said receiver to said measurement point;
    passively measuring a second duration of time that spans:
        (1) from when said corresponding acknowledgement travels from said measurement point to said sender; and
        (2) when a triggered packet travels from said sender to said measurement point;
    summing said first and second durations to compute a first RTT value;
    repeating said measuring and summing steps for subsequent packets to determine respective RTT values; and
    calculating an average RTT value by utilizing the determined RTT values and a total number of RTT values.

2. The media of claim 1, wherein calculating RTT value includes discarding one or more RTT computations associated with one or more additional packets if said one or more of said additional packets is a retransmitted packet whereby said retransmitted packet's RTT value will not be included in updating said RTT.

3. The media of claim 1, wherein calculating an average RTT value includes discarding one or more RTT computations associated with one or more additional packets if said one or more of said additional packets is a duplicate-acknowledgment packet whereby said duplicate-acknowledgment's RTT value will not be included in updating said RTT.

4. The media of claim 1, wherein calculating an average RTT value includes discarding one or more RTT computations associated with one or more additional packets if said one or more of said additional packets is a three-times-received duplicate-acknowledgment packet whereby said three-times-received duplicate-acknowledgment's RTT value will not be included in updating said RTT.

5. One or more tangible computer-storage media have computer-readable instructions embodied thereon for performing a method for computing the Round-Trip Time (RTT) of a telecommunications pathway, comprising:

maintaining a measuring point of the telecommunications pathway in a frozen state that persists as long as retransmitted data packets are consecutively received by the measuring point;

receiving from a sender a new data packet, which has a sequence number that is greater than or equal to another sequence number of a previously received data packet;

transitioning the measuring point to a default state that is usable to compute the RTT of the new data packet;

providing a first timestamp associated with the new data packet traveling past the measurement point within said pathway;

providing a second timestamp associated with a second packet traveling past said measurement point, said second packet transmitted incident to a valid reception of said new data packet;

calculating a difference between said second timestamp and said first timestamp to derive a first RTT value; and deriving a current RTT value, whereby third and fourth timestamps associated with subsequent packets are measured, calculated, and averaged with a previously calculated RTT value.

6. The media of claim 5, wherein said new data packet and said second packet are in-use packets rather than packets introduced into the pathway for the purpose of being measured.

7. The media of claim 6, further comprising repeating the steps of providing, calculating and deriving to compute a running RTT value.

8. The media of claim 7, wherein said computing the running RTT value includes discarding one or more RTT computations associated with one or more of said additional packets if said one or more of said additional packets is a retransmitted packet whereby said retransmitted packet's RTT value will not be included in updating said RTT computation.

9. The media of claim 6, wherein said computing the running RTT value includes discarding one or more RTT computations associated with one or more of said additional packets if said one or more of said additional packets is a duplicate-acknowledgment packet whereby said duplicate-acknowledgment's RTT value will not be included in updating said RTT computation.

10. The media of claim 6, wherein said computing the running RTT value includes discarding one or more RTT computations associated with one or more of said additional packets if said one or more of said additional packets is a three-times-received duplicate-acknowledgment packet whereby said three-times-received duplicate-acknowledgment's RTT value will not be included in updating said RTT computation.

11. One or more tangible computer-storage media having computer-readable instructions embodied thereon for performing a method of estimating the Round-Trip Time (RTT) of a connection, comprising:

receiving a first timestamp corresponding to when a first packet sent from a sending device passes a measurement point within said connection;

receiving a second timestamp corresponding to when an acknowledgment of said first packet passes said measurement point;

receiving a third timestamp corresponding to a when a second packet sent from the sending device passes said measurement point;

providing for the difference between said third timestamp and said first time stamp to yield said RTT estimation; and maintaining a measuring point of the telecommunications pathway in a frozen state that persists as long as retransmitted data packets are consecutively received by the measuring point;

transitioning the measuring point to a default state that is usable to compute the RTT of the new data packet;

updating said RTT estimation to create a running-RTT estimation, which takes into account RTT estimates both throughout the connection's lifetime and between a plurality of senders and receivers.

12. The media of claim 11, wherein said first and second packets are subparts of respective packet groups.

13. The media of claim 12, wherein updating said RTT comprises:

receiving a fourth timestamp when each additional packet sent from a sending device passes a measurement point within said connection;

receiving a fifth timestamp corresponding to when acknowledgments of each of the additional packets passes said measurement point; and receiving a sixth timestamp corresponding to a when a subsequent packet, sent from the sending device after an additional packet, passes said measurement point.

14. The media of claim 13, wherein updating said RTT includes discarding one or more RTT computations associated with one or more of said additional packets if said one or more of said additional packets is a retransmitted packet whereby said retransmitted packet's RTT value will not be included in updating said RTT.

15. The media of claim 13, wherein updating said RTT includes discarding one or more RTT computations associated with one or more of said additional packets if said one or more of said additional packets is a duplicate-acknowledgment packet whereby said duplicate-acknowledgment's RTT value will not be included in updating said RTT.

16. The media of claim 13, wherein updating said RTT includes discarding one or more RTT computations associated with one or more of said additional packets if said one or more of said additional packets is a three-times-received duplicate-acknowledgment packet whereby said three-times-received duplicate-acknowledgment's RTT value will not be included in updating said RTT.

* * * * *

UNITED STATES PATENT AND TRADEMARK OFFICE
CERTIFICATE OF CORRECTION

PATENT NO. : 7,636,321 B1  Page 1 of 1
APPLICATION NO. : 10/435800
DATED : December 22, 2009
INVENTOR(S) : Iannaccone et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1742 days.

Signed and Sealed this

Ninth Day of November, 2010

David J. Kappos
*Director of the United States Patent and Trademark Office*